US006647264B1

(12) United States Patent
Sasamoto

(10) Patent No.: US 6,647,264 B1
(45) Date of Patent: Nov. 11, 2003

(54) MOBILE COMMUNICATION SYSTEM AND METHOD FOR TRANSMISSION OF CONNECTION LESS PACKETS

(75) Inventor: Yoshifumi Sasamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/401,283

(22) Filed: Sep. 23, 1999

(30) Foreign Application Priority Data

Sep. 24, 1998 (JP) .......................................... 10-269326

(51) Int. Cl.[7] .................................................. H04Q 7/20
(52) U.S. Cl. ........................ 455/445; 455/435; 455/458; 455/560; 370/353; 370/401; 370/328
(58) Field of Search ................................ 455/433, 435, 455/445, 517, 560, 458, 466, 422, 561, 550, 432; 370/328, 329, 349, 353, 352–356, 401, 432, 351, 400, 431

(56) References Cited

U.S. PATENT DOCUMENTS

| 4,700,374 | A | | 10/1987 | Bini | |
|---|---|---|---|---|---|
| 5,548,586 | A | | 8/1996 | Kito et al. | |
| 5,734,984 | A | * | 3/1998 | Reece et al. ................ | 455/436 |
| 5,748,620 | A | | 5/1998 | Capurka | |
| 5,793,762 | A | * | 8/1998 | Penners et al. ............. | 370/352 |
| 5,901,142 | A | * | 5/1999 | Averbuch et al. ........... | 370/329 |
| 5,936,936 | A | * | 8/1999 | Alexander et al. .......... | 370/216 |
| 6,035,203 | A | * | 3/2000 | Hanson ....................... | 455/422 |
| 6,205,139 | B1 | * | 3/2001 | Voit ............................ | 370/389 |
| 6,226,511 | B1 | * | 5/2001 | Jacobs et al. ................ | 455/411 |
| 6,272,148 | B1 | * | 8/2001 | Takagi et al. ............... | 370/469 |
| 6,292,479 | B1 | * | 9/2001 | Bartholomew et al. ..... | 370/352 |
| 6,404,754 | B1 | * | 6/2002 | Lim ............................ | 370/338 |
| 6,418,128 | B1 | * | 7/2002 | Takagi et al. ............... | 370/328 |

FOREIGN PATENT DOCUMENTS

| EP | 0 642 283 A2 | 3/1995 |
|---|---|---|
| WO | WO 95/28063 A2 | 10/1995 |

* cited by examiner

Primary Examiner—Nguyen T. Vo
Assistant Examiner—Edan Orgad
(74) Attorney, Agent, or Firm—Foley & Lardner

(57) ABSTRACT

In a mobile communication system, a gateway is connected to a connectionless data network for receiving a series of packets of same destination. A number of routers are connected to the gateway and a number of wireless access networks are connected respectively to the routers for establishing wireless links with mobile stations. The gateway is arranged to transmit a request message to all of the routers in response to receipt of the packet of first arrival from the data network to request a search for a mobile station specified by the packet. Each of the routers includes a memory for storing location data of mobile stations. Each router makes a search through its own memory in response to the request message, and responds with a reply message to receive the packets of first and second arrival from the gateway if the specified mobile station is found in the memory, and routes the received packets via the corresponding wireless access network to the mobile station.

23 Claims, 11 Drawing Sheets

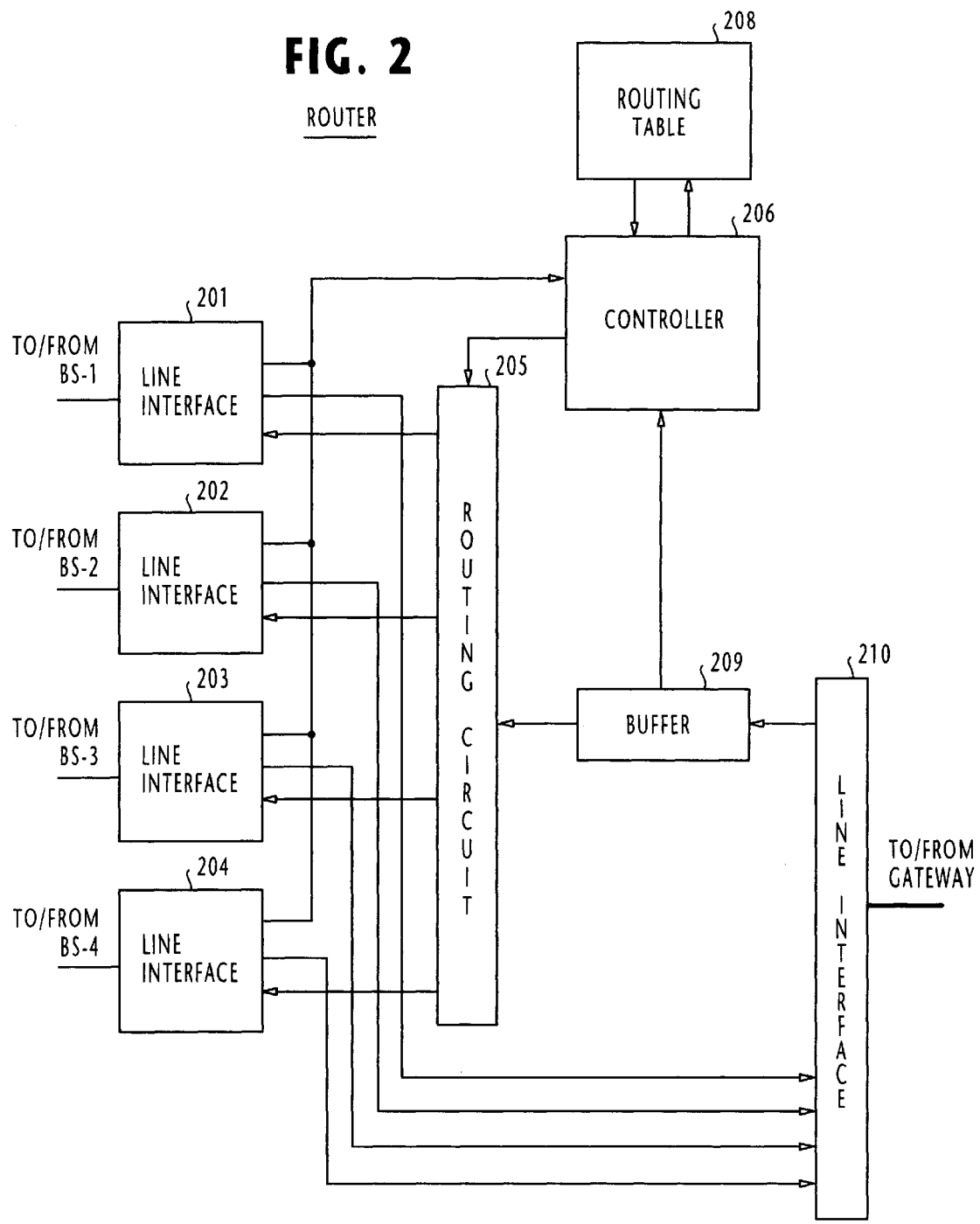

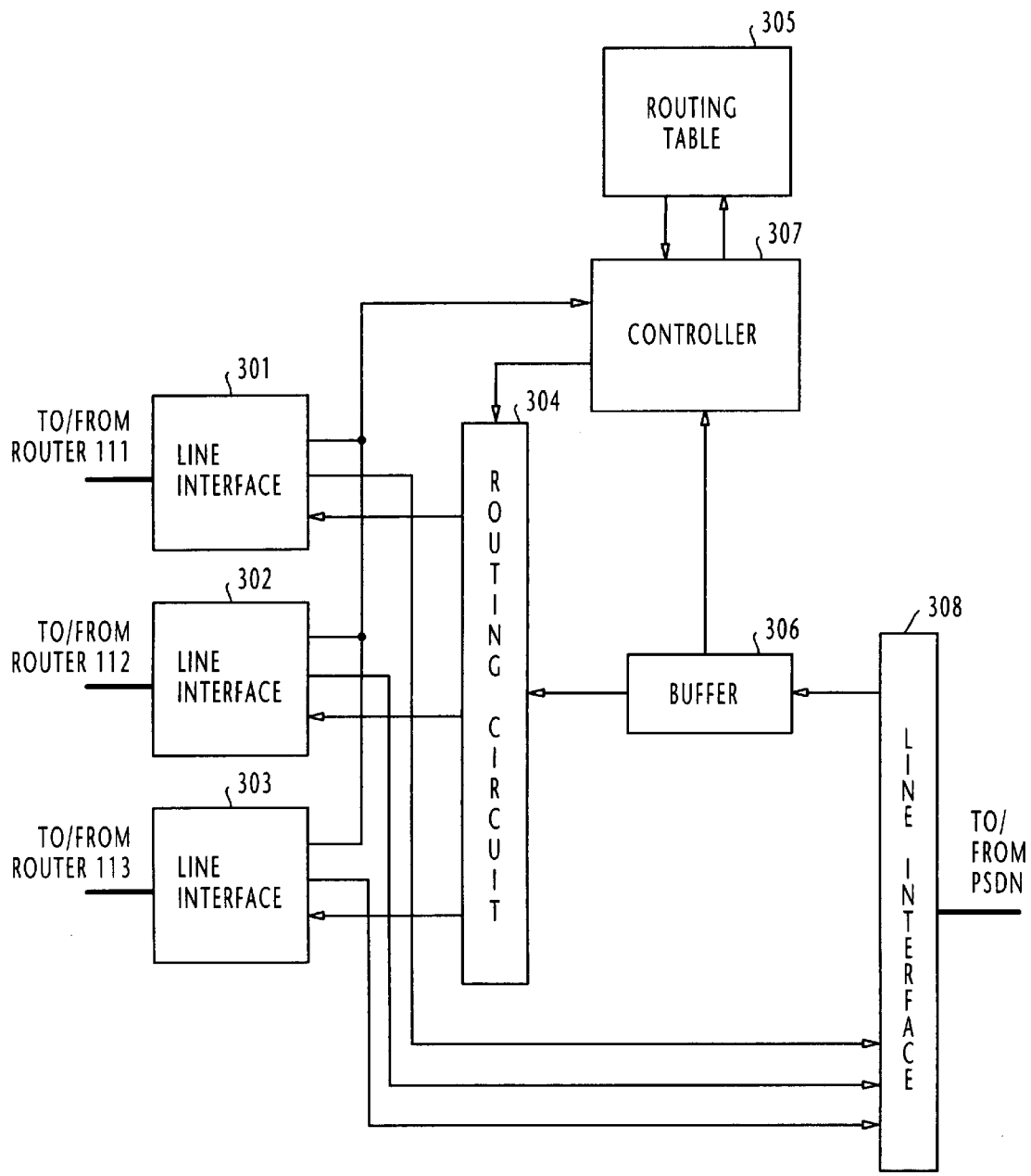

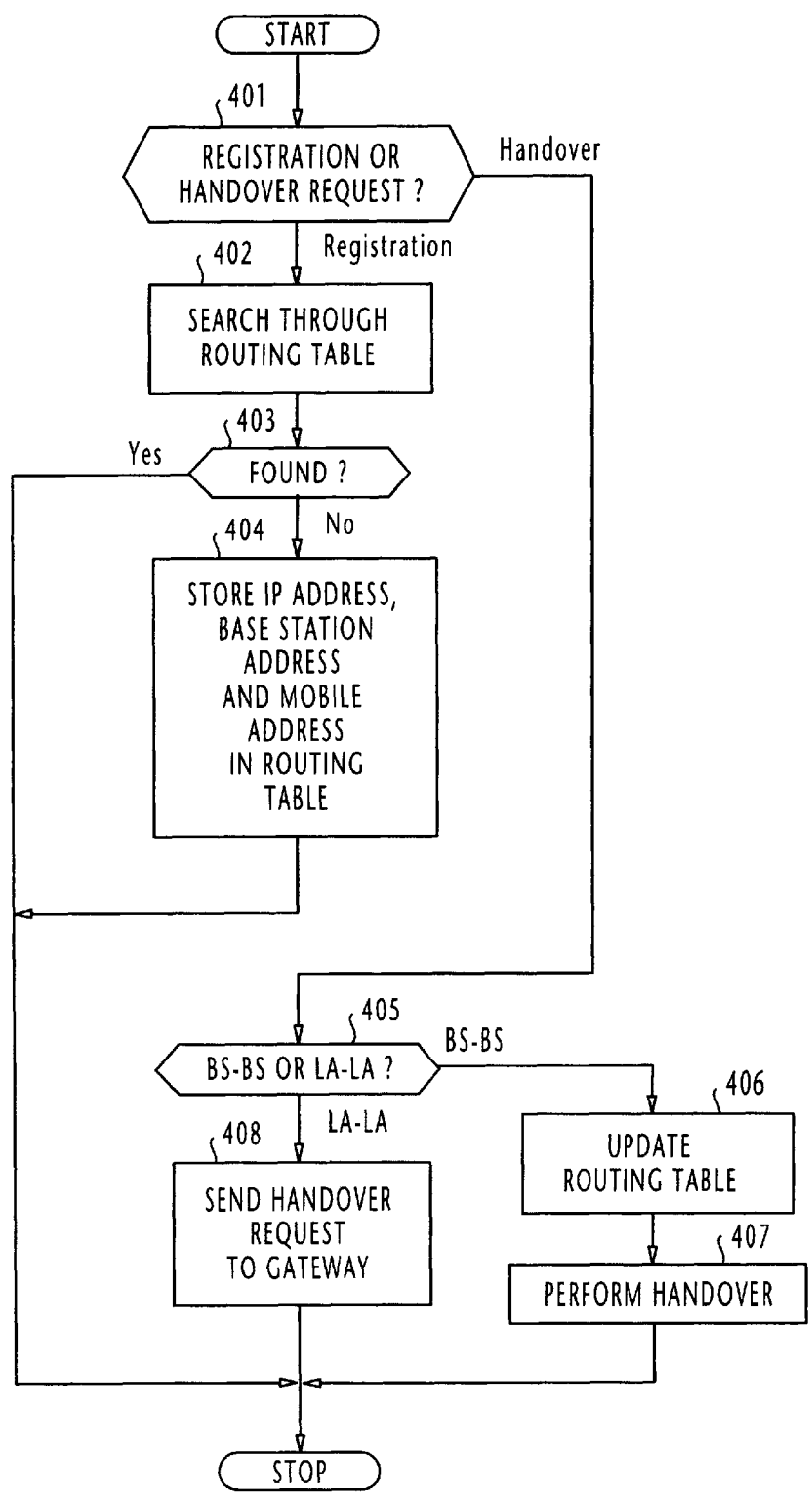

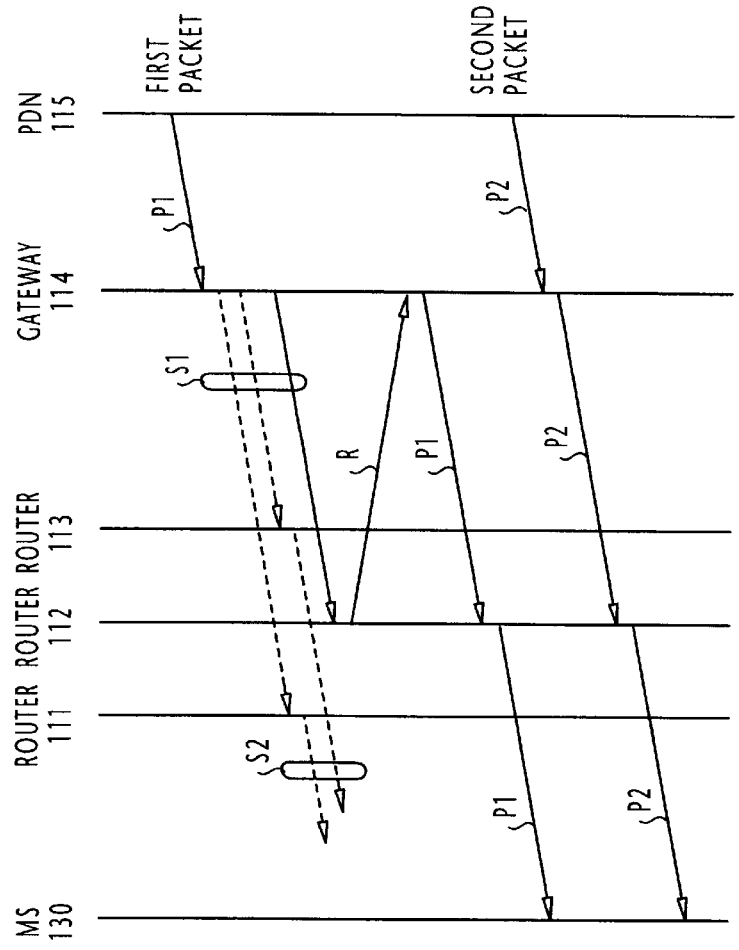
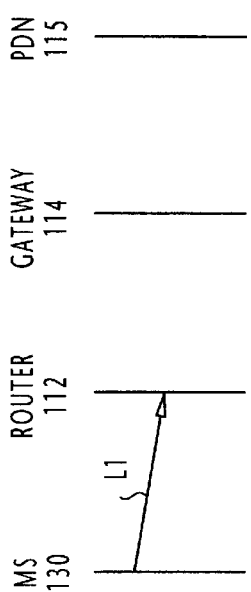
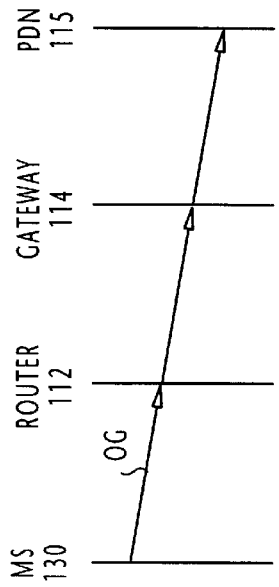

HANDOVER

INCOMING CALL

GATEWAY

GATEWAY

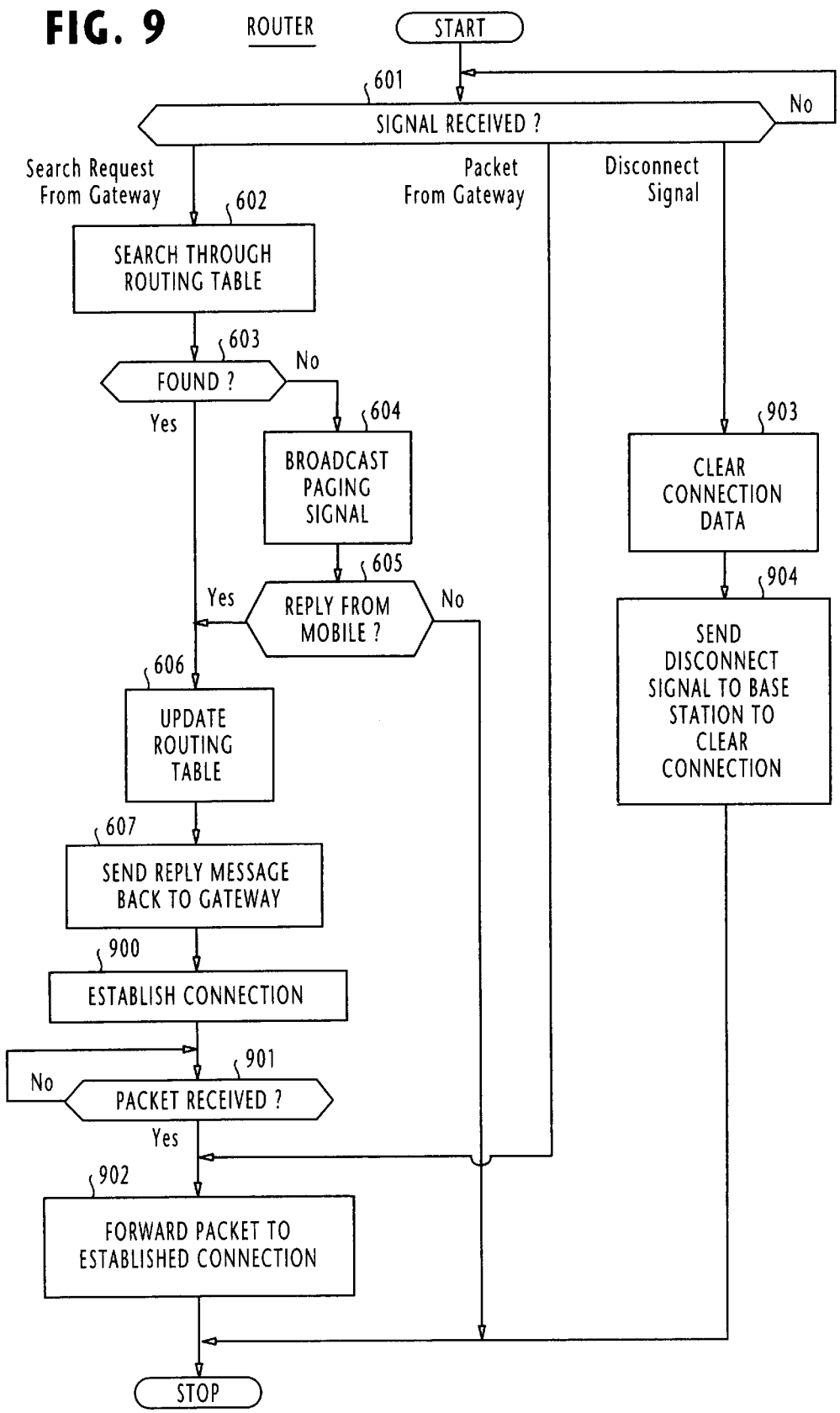

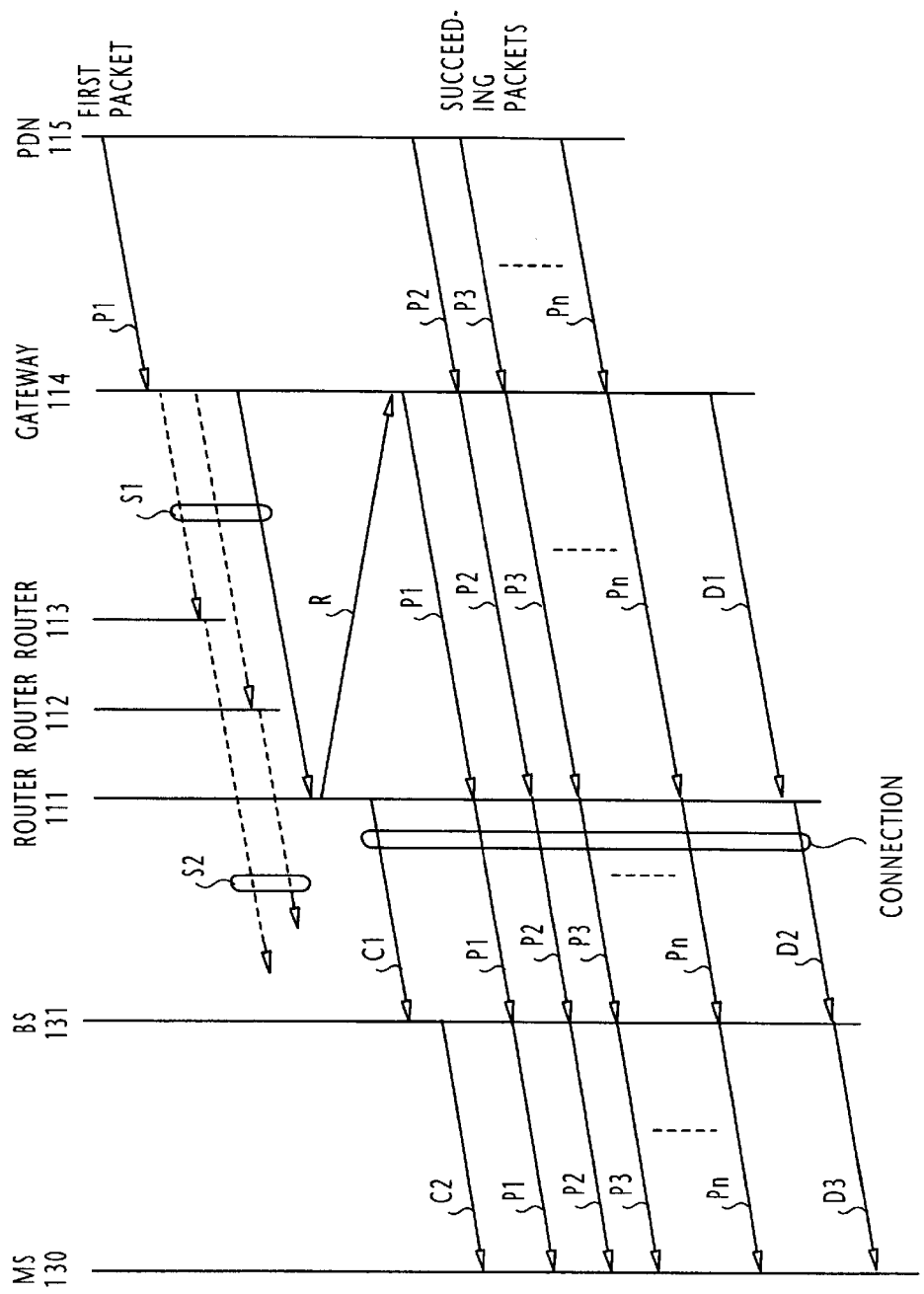

MOBILE COMMUNICATION SYSTEM AND METHOD FOR TRANSMISSION OF CONNECTION LESS PACKETS

BACKGROUND OF THE INVENTION

1. Field of the Invention

The present invention relates generally to mobile communication systems, and more particularly to a mobile communication system for dealing with connectionless packets.

2. Description of the Related Art

Mobile data terminals are increasingly used in cellular communication systems to provide TCP/IP (Transmission Control Protocol/Internet Protocol)-based connectionless mode communication via the Internet. Since the cellular communication system is a connection-oriented network, network resource is not utilized efficiently for connectionless mode communications. Furthermore, since the prior art location management is performed by the use of a home location register centrally co-located with a mobile switching center, the delay involved with locating a destination mobile data terminal is significantly large if the data terminal is moving at high speeds. Additionally, it is desirable to perform fast handover operation.

SUMMARY OF THE INVENTION

It is therefore an object of the present invention to provide a mobile communication system and method that is suitable for connectionless data communication.

According to a first aspect of the present invention, there is provided a mobile communication system comprising a gateway connected to a connectionless data network, a plurality of routers connected to the gateway, and a plurality of wireless access networks, connected respectively to the routers, for establishing wireless links with mobile stations. The gateway is arranged to transmit a request message to all of the routers in response to a packet from the connectionless data network for requesting a search for a mobile station specified by the packet. Each of the routers includes a memory for storing location data of mobile stations, and makes a search through the memory in response to the request message to receive that packet from the gateway if the specified mobile station is found in the memory, and routes the received packet via the corresponding wireless access network to the mobile station.

The gateway may be arranged to receive a series of packets of same destination from the connectionless data network, and transmits the request message to all of the routers in response to the packet of first arrival for requesting a search for a mobile station specified by the packet of first arrival. Each of the routers is arranged to respond to the request message with a reply message if the specified mobile station is found in the memory of the router. The gateway sequentially transmits the received packets to the router from which the reply message is received.

The gateway may be further arranged to receive a series of packets of same destination from the connectionless data network, transmit a request message to all of the routers in response to receipt of the packet of first arrival for requesting a search for a mobile station specified by the packet of first arrival. The gateway then transmits the packet of first arrival to one of the routers which responds with a reply message, and transmits the packet of second arrival to the responding router if the packet of second arrival is received before a predetermined time interval expires, and transmit a disconnect signal to the responding router if the predetermined time interval expires after the transmission of each of the packets of first and second arrival. Each of the routers is arranged to respond to the request message with the reply message if the specified mobile station is found in the memory to receive the packets of first and second arrival and establish a connection to the specified mobile station via the corresponding wireless access network, transmit the received packets to the specified mobile station over the established connection, and clear the connection in response to the disconnect signal.

According to a second aspect, the present invention provides a method of communication for a system comprising a gateway connected to a connectionless data network, a plurality of routers connected to the gateway, and a plurality of wireless access networks, connected respectively to the routers, for establishing wireless links with mobile stations, each of the routers including a memory for storing location data of mobile stations. The method comprises the steps of (a) receiving a packet of first arrival from the connectionless data network at the gateway, (b) transmitting a request message from the gateway to all of the routers in response to receipt of the packet for requesting a search for a mobile station specified by the packet of first arrival, (c) making a search through the memory of each of the routers in response to the request message from the gateway, (d) receiving, at one of the routers, the packet from the gateway if the specified mobile station is found in the memory of the one router, and (e) routing the received packet via the corresponding wireless access network to the mobile station.

According to a third aspect of the present invention, the method of communication comprises the steps of (a) receiving, at the gateway, packets of first and second arrival of same destination from the connectionless data network, (b) transmitting a request message from the gateway to all of the routers in response to receipt of the packet of first arrival for requesting a search for a mobile station specified by the packet of first arrival, (c) making a search through the memory of each of the routers in response to the request message from the gateway, (d) transmitting a reply message from one of the routers to the gateway if the specified mobile station is found in the memory of the router, (e) transmitting the packets from the gateway to the router in response to the reply message; and (f) receiving, at the router, the packets from the gateway and routing the received packets via the corresponding wireless access network to the mobile station.

According to a fourth aspect of the present invention, the method of communication comprises the steps of (a) receiving, at the gateway, packets of first and second arrival of same destination from the connectionless data network, (b) transmitting a request message from the gateway to all of the routers in response to receipt of the packet of first arrival for requesting a search for a mobile station specified by the packet, (c) making a search, at each of the routers, through the memory of the router in response to the request message and transmitting a reply message back to the gateway from one of the routers if the specified mobile station is found in the memory of the router and establishing a connection from the router to the specified mobile station via the corresponding wireless access network, (d) transmitting, from the gateway to the router, the packet of first arrival in response to the reply message, (e) transmitting, from the gateway to the router, the packet of second arrival if the packet of second arrival is received before a predetermined time interval expires, (f) transmitting, from the gateway to the router, a disconnect signal if the predetermined time interval expires after the transmission of each of the packets of first and second arrival, (g) transmitting the packets of first and second arrival from the router to the specified mobile station over the established connection, and (h) clearing the connection in response to the disconnect signal.

BRIEF DESCRIPTION OF THE DRAWINGS

The present invention will be described in further detail with reference to the accompanying drawings, in which:

FIG. 2 is a block diagram of a mobile router;

FIG. 3 is a block diagram of the mobile gateway;

FIG. 4 is a flowchart of the operation of the mobile router when registration request message is received from a mobile station;

FIGS. 7A, 7B, 7C, 7D and 7E are sequence diagrams useful for describing the various operational phases of the first embodiment of the present invention according to the first embodiment;

FIG. 9 is a flowchart of the operation of a mobile router according to the second embodiment; and FIG. 10 is a sequence diagram of incoming calls according to the second embodiment of the present invention.

DETAILED DESCRIPTION

Figure 1:
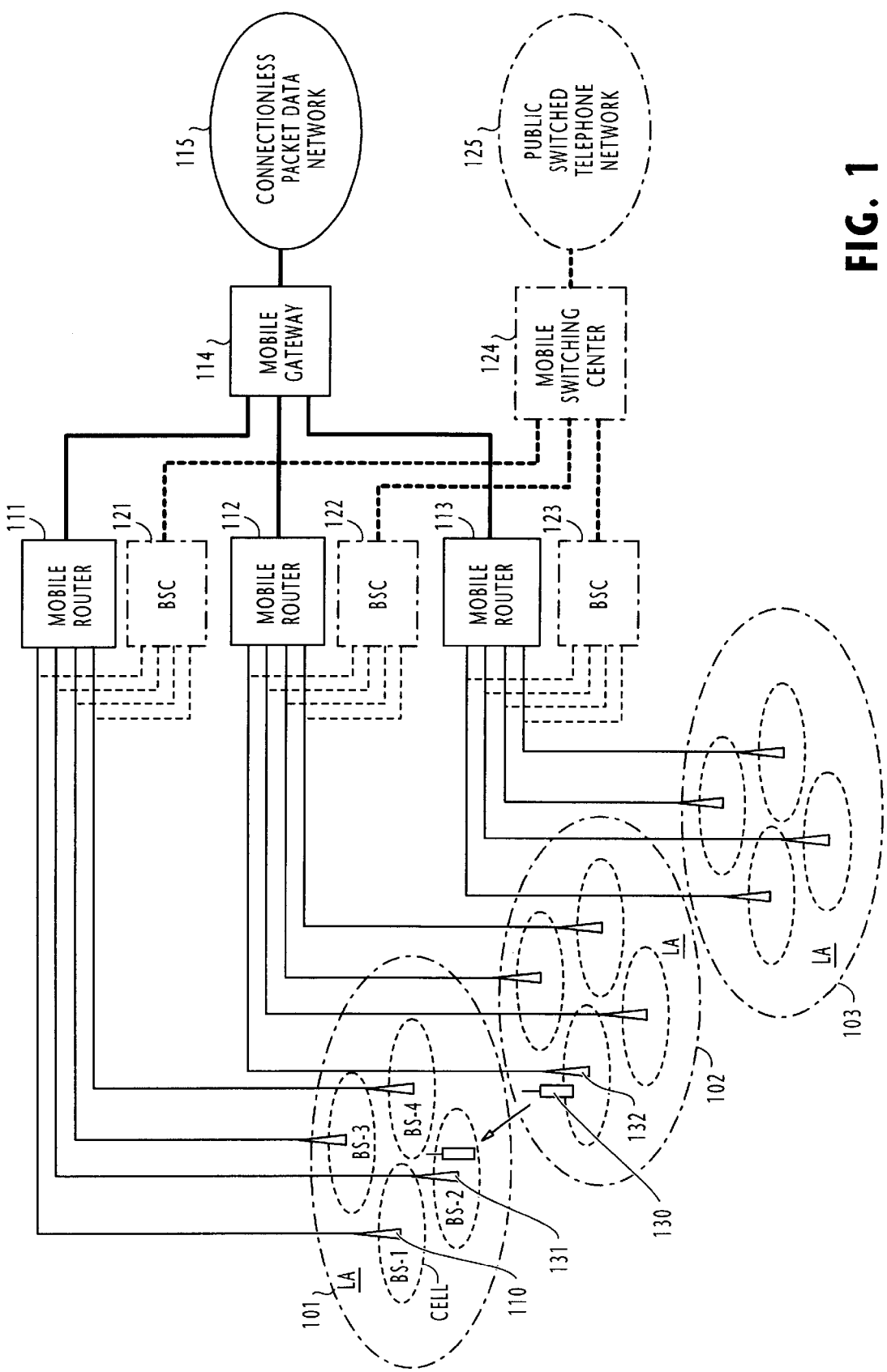
FIG. 1 is a block diagram of a cellular mobile packet network according to a first embodiment of the present invention.

In FIG. 1, an exemplary cellular mobile communication system of the present invention is illustrated. The service area of the system is divided into a plurality of location areas (LA) 101, 102, 103, and each of these location areas serves a number of cellsite base stations 110 for registration of mobile stations as their home location. In the illustrated embodiment, each location area has a group of four base stations BS-1 to BS-4. Associated respectively with the location areas 101, 102 and 103 are mobile routers 111, 112 and 113 connected to a mobile gateway 114 which is, in turn, connected to a connectionless packet data network 115. The base stations of each location area form a wireless access network between mobile stations, or user's data terminals and the mobile router associated with the location area.

Mobile routers 111 to 113 may be co-located with existing base station controllers 121, 122 and 123 which provide mobile telephone service between associated base stations 110 and the existing mobile switching center 124 connected to a public switched telephone network 125. Mobile gateway 114 may be co-located with the mobile switching center 124.

As shown in detail in FIG. 2, each mobile router includes line interface units 201 through 204 which interface between the base stations BS-1 through BS-4 and a routing circuit 205 and a controller 206. Registration request message periodically transmitted from a mobile station is received by the controller 206. If the mobile station is not registered, the controller 206 directs a routing table 208 to map the address of the mobile station to the address of the base station with which it is in communication. Further, the controller 206 stores routing data necessary for routing packets. A buffer 209 is connected between the routing circuit 205 and a line interface unit 210 that interfaces the buffer 209 to the mobile gateway 114.

Router controller 206 exchanges control messages with the associated base stations via interface units 201 through 204. Incoming connectionless packets (or datagrams) from the gateway are stored in the buffer 209 and forwarded through the routing circuit 205 to one of the base stations which is specified by the controller 206. If the data stored in the buffer 209 is a data packet, the controller 206 rewrites the routing field of the packet according to the destination address contained in the preceding control packet and forwards it through the routing circuit 205. All incoming packets are stored in the buffer 209 and forwarded through the routing circuit 205 to one of the line interface units 201 to 204. In each of the line interface units 201 through 204, all outgoing packets from mobile stations are passed on to the line interface unit 210 and transmitted to the mobile gateway 114.

In FIG. 3, the mobile gateway 114 is connected to the mobile routers 111, 112 and 113 via line interface units 301 through 303 and connected to the connectionless data network 115 via a line interface unit 308. Gateway 114 has a routing circuit 304, a routing table 305 and a buffer 306 which are controlled by a controller 307.

Gateway controller 307 exchanges control signals with the routers via line interface units 301 through 303. All incoming packets from the data network 115 are stored in the buffer 306 and forwarded through the routing circuit 304 to one of the routers which is specified by the controller 307. If the data stored in the buffer 306 is a data packet, the controller 307 rewrites its routing field according to the destination address contained in the preceding control packet and forwards it through the routing circuit 304. All incoming packets are stored in the buffer 306 and forwarded through the routing circuit 304 to one of the line interface units 301 to 303. In each of the line interface units 301 through 303, all outgoing packets from the mobile routers are passed on to the line interface unit 308 and transmitted to the data network 115.

According to the first embodiment of this invention, the whole system operates as a connectionless network for routing datagrams (single packets) from the data network 115 to mobile stations.

The operation of the controller 206 of each mobile router and of the controller 307 of the mobile gateway will be described in detail below with the aid of the flowcharts of FIGS. 4 and 5, respectively.

In FIG. 4, the operation of the mobile router starts with step 401 in response to receipt of a periodic registration request message or a handoff request message from a mobile station. If the registration request is received, the router makes a search through the routing table 208 to check to see if the mobile station is already registered (step 402). If the requesting mobile station is new for a given location area, the decision at step 403 is negative and the controller proceeds to step 404 and stores the IP address, the address of the mobile station and the address of the base station which the mobile station is in communication with into the routing table 208, and then terminates the routine.

If the mobile station is already registered in the routing table 208, the decision at step 403 is affirmative and the router proceeds to the end of the routine. If a handover request is received from the mobile station, the controller proceeds from step 401 to step 405 to determine whether the mobile station is crossing the boundary between cell-site areas of the same location area or crossing the boundary between two location areas. If the mobile station is entering a new cell-site area, the routine determines that a base-to-base handover is necessary and proceeds from step 405 to step 406 to update the routing table 208 with the address of the new base station and the router performs a handover operation on the mobile station to switch its communication path to the new base station and clears the previous path (step 407). If the mobile station is entering a new location area, the routine proceeds from step 405 to step 408 to transmit a LA-to-LA handover request message to the gateway 114.

Figure 5A:
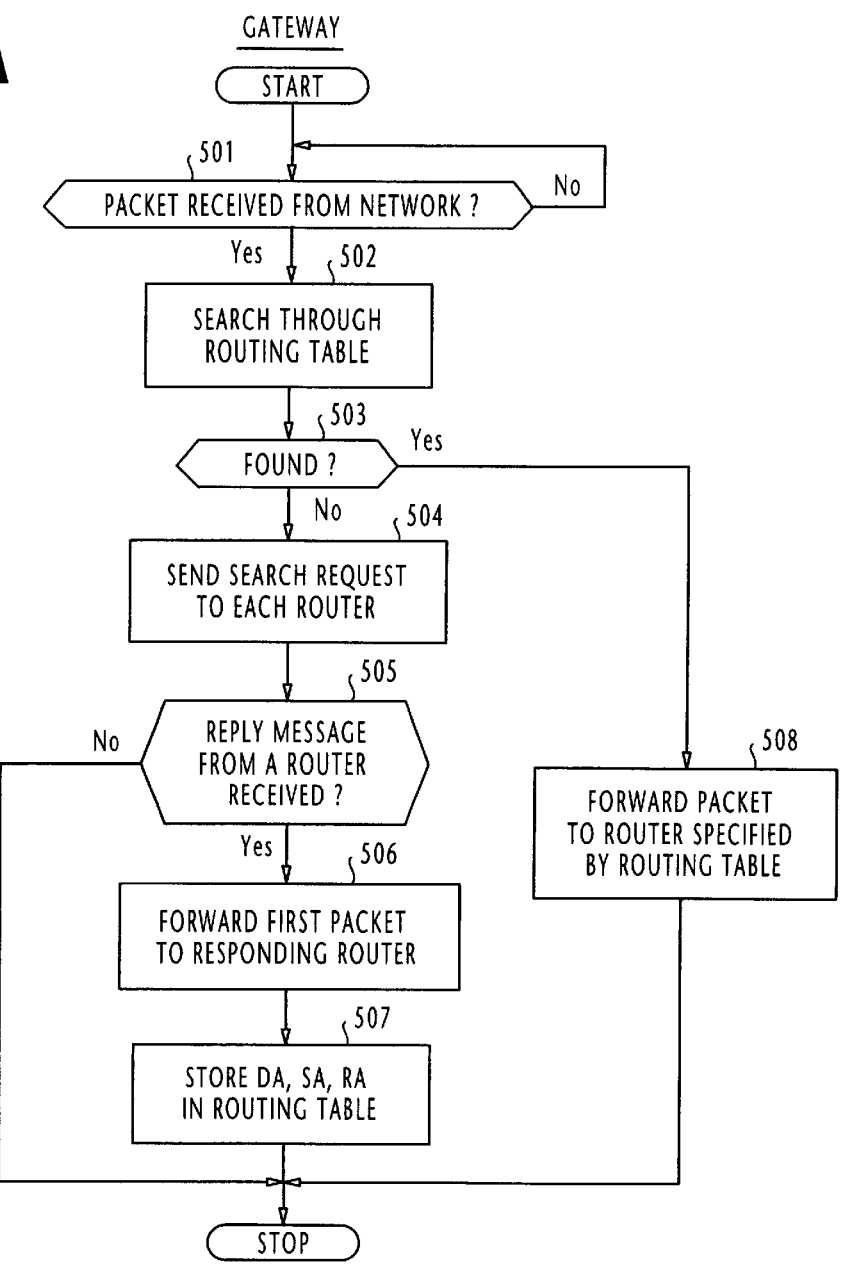
FIGS. 5A and 5B are flowcharts of the operation of the mobile gateway of FIG. 3 according to a first embodiment of the present invention.

In FIG. 5A, the operation of the controller 307 begins with step 501 in response to receipt of a packet from the data network 115. At step 502, the controller 307 makes a search through the routing table 305 for the routing data associated with the packet. If such routing data is not found, the controller proceeds from step 503 to step 504 and sends a search request message to each of the mobile routers 111, 112 and 113 and waits for a reply message. If the destination is located in the location area of one of the routers, the controller 307 receives a reply message from that router (step 505). The reply message contains the location data of the destination mobile station (the addresses of the destination mobile station and base station).

At step 506, the gateway controller forwards the packet to the router that responded to the request message. More specifically, the controller 307 examines the destination address contained in the reply message, controls the routing circuit 304 and forwards the packet to the appropriate router via the routing circuit 205.

After transmission of the packet, the gateway controller proceeds to step 507 to 507 to store the destination address (DA), the source address (SA) contained in the packet and the router address (RA) in the routing table 305.

If no reply message is received within a predefined time interval, it is determined that the desired mobile station is not located in any of the location areas and the controller 307 terminates the routine.

If the destination address of the packet received from the data network 115 is found in the routing table 305, the decision at step 503 is affirmative and the controller 307 proceeds to step 508 to control the routing circuit 304 according to the routing data found in the routing table 305 and forwards the packet to the routing circuit 304 for transmission to the associated router.

If the gateway 114 has transmitted a search request message to each of the mobile routers to determine the actual location of the destination mobile station and if this mobile station is registered in the location register of one of the routers, this router responds to the request message from the gateway with a reply message.

Figure 5B:
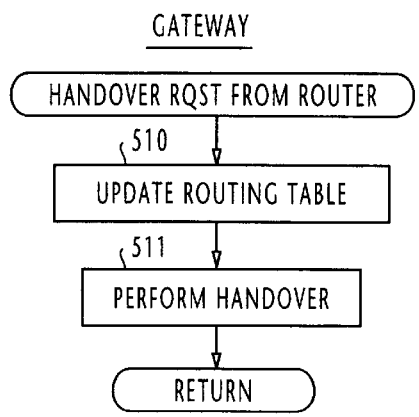

When the gateway 114 receives an LA-to-LA handover request message from one of the routers, the main routine of FIG. 5A is interrupted and an interrupt routine of FIG. 5B is executed, at step 510, by updating the routing table 305 with the address of the new router to which the current communication is to be handed over. At step 511, the router performs a handover operation on the mobile station so that its communication path is switched to the new base station and the previous path is cleared. The router then returns to the main routine (FIG. 5A).

Figure 6:
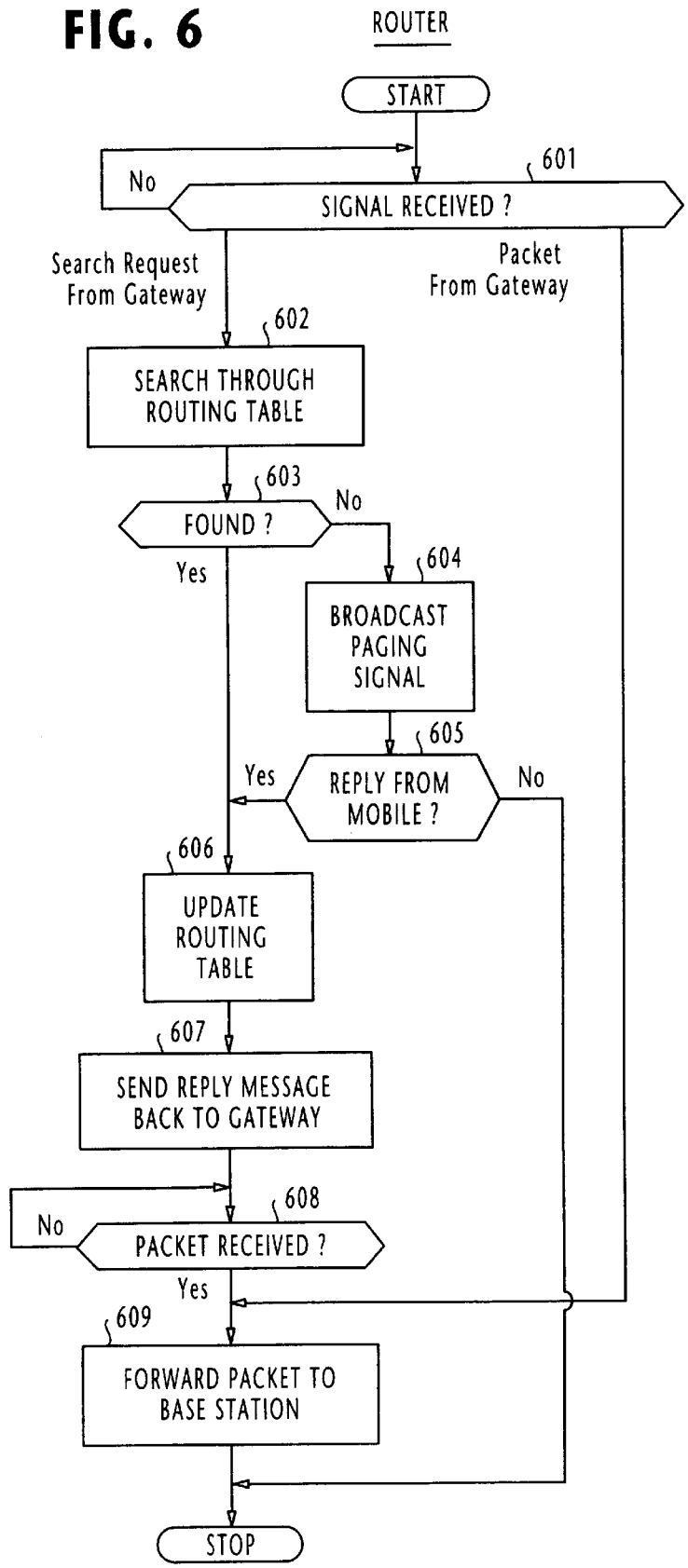
FIG. 6 is a flowchart of the operation of the mobile router according to the first embodiment.

In FIG. 6, the router controller 206 responds to the search request message from the gateway 114 at step 601 to proceed to step 602 to make a search through the routing table for location data of the destination mobile station specified by the request message. If there is none (step 603), the routine proceeds to step 604 to broadcast a paging signal to all of its base stations and waits for a reply message (step 605). If no reply is received within a predefined time interval, the controller proceeds to the end of the routine.

If a reply message is returned from the destination mobile station via one of its base stations, the controller proceeds from step 605 to step 606 to update the routing table 208 with routing data including the IP address of the destination mobile station, the telephone number of the destination mobile station and the address of the base station, in the coverage area of which the mobile station is currently located.

If the appropriate location data of the specified mobile station is found in the routing table 208, the controller proceeds from step 603 to step 606 to update the routing table.

At step 607, the controller 206 sends a reply message back to the gateway 114 to inform it of the routing data of the destination mobile station and the source destination contained in the first packet. Then, the router controller 206 waits for the first packet from the gateway (step 608). When the controller receives the first packet, it proceeds to step 609 to control the routing circuit 205 according to the data stored in the routing table 208 and forwards the first packet to the destination via the routing circuit 205, and terminates the routine.

If a packet destined for the same destination mobile station is subsequently received from the gateway, the routine proceeds from step 601 to step 609 to forward the received packet to the destination using the data stored in the routing table.

For a full understanding of the first embodiment of the present invention, reference is made to the sequence diagrams of FIGS. 7A to 7E.

FIG. 7A shows that a mobile station 130 (FIG. 1) is in cellsite area of base station 132 of location area 102 and transmits its periodic registration request message L1. Router 112 will receive this message via base station 131 and updates the routing table 208. Because of the first registration, the routing table of the router 112 indicates that the mobile station 130 is not registered. The addresses of the mobile station 130 and the base station 131 are then mapped in the routing table of the router 112.

FIG. 7B shows an outgoing call originated from the mobile station 130. A packet OG, sent from the mobile station, is received by the router 112, relayed through its line interfaces to the gateway 114, where the packet is further relayed through its line interfaces to the data network 115.

In FIG. 7C, a sequence diagram of incoming calls to the mobile station 130 according to the first embodiment is illustrated. In response to a first packet P1 from the data network 115, the gateway 114 sends search request messages S1 to the routers 111, 112 and 113. Since the location data of the mobile station 130 is stored only in the router 112, the latter responds with a reply message R, while the other routers broadcast paging signals S2 only to find that the requested mobile station is not within their location areas. Gateway 114 responds to the reply message R from the router 112 by sending the packet P1 to the router 112 and storing the routing data (DA, SA, RA) of the packet P1 in its routing table. Router 112 transmits the packet P1 to the mobile station 130 via the base station 131. When a second packet P2 arrives, the gateway 114 forwards it simply to the router 112 by using the corresponding data stored in its routing table and the router 112 relays the packet P2 to the mobile station. Subsequent packets destined for the mobile station 130 will be transmitted in the same manner as the packet P2.

Figure 7E:
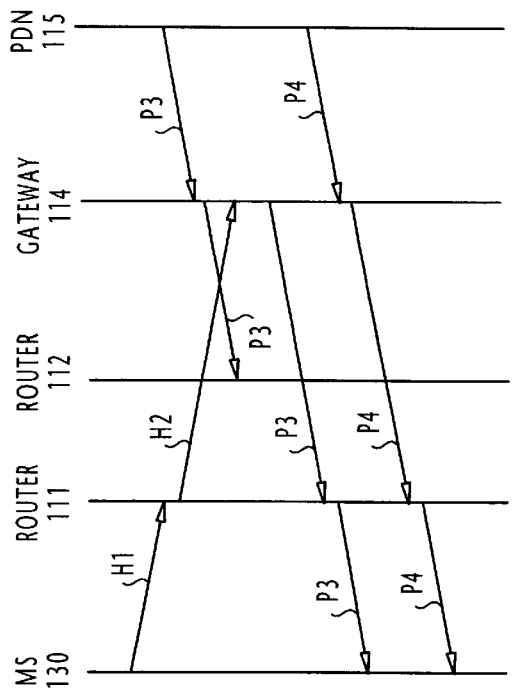
Figure 7D:
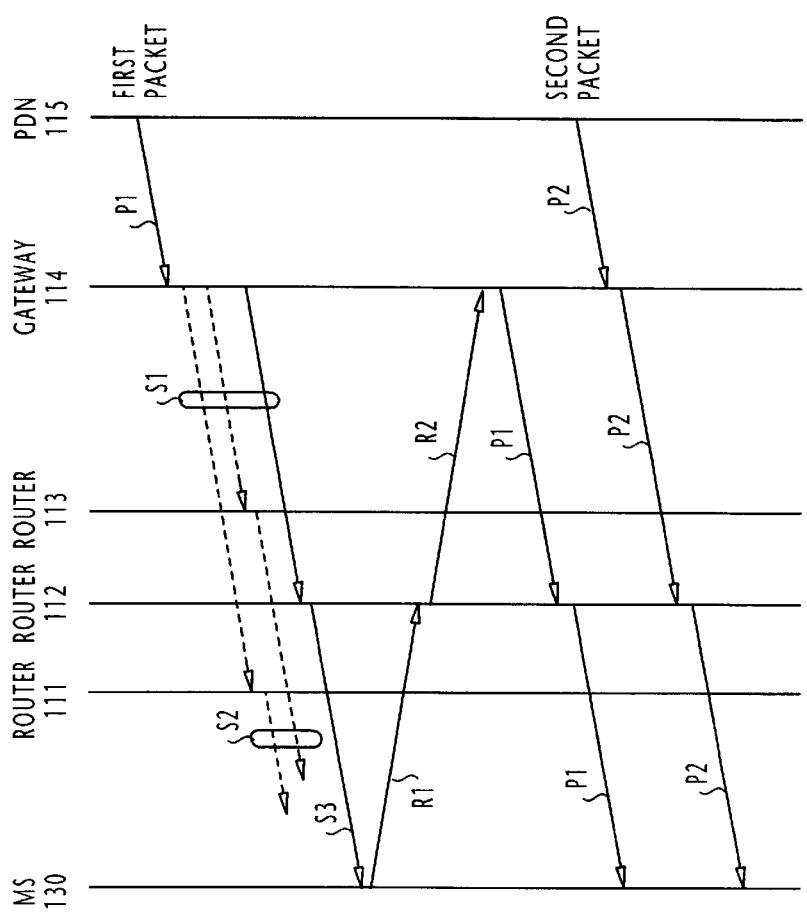

If the first packet is received from the data network before the mobile station 130 is registered in the routing table of router 112, the router 112 fails to find the location data of the destination and broadcasts a paging signal S3 as shown in FIG. 7D. Mobile station 130 responds to the paging signal S3 with a reply message R1, to which the router 112 responds by storing the location data of the mobile station 130 and sends a reply message R2 back to the gateway 114 in order to receive the packet P1.

In FIG. 7E, assume that the router 112 is communicating with the mobile station 130 and is receiving a packet P3 from the gateway 114. If the mobile station 130 is leaving the location area 102 and entering the location area 101 as shown in FIG. 1, a handoff request message H1 will be sent from the mobile station to the router 111 via base station 131, which is then transmitted as a handoff request message H2 to the gateway 114. If the gateway 114 receives the message H2 from the router 111 immediately following the transmission of the packet P3 to the router 112, the gateway performs a handoff operation by sending a copy of the packet P3 to the router 111, where it is relayed to the mobile station 130. Subsequent packet P4 from the network 115 is routed through the gateway 114 and the router 111 to the mobile station 130.

Since the routing data of the communicating mobile station is stored in the associated router, the base-to-base handoff operation will be carried out in a short period of time.

In a second embodiment of this invention, all the access networks of the system operate as a connection-oriented network and the intermediate section of the system between the access networks and the mobile gateway 114 operate as a connectionless network. For each incoming datagram, a connection is set up in the connection-oriented network between a mobile router and a destination mobile station for a predetermined interval of time in order that datagrams arriving in rapid succession from the data network 115 are routed to the destination over the established connection, while the connectionless part of the system provides routing of each datagram without establishing a connection. This embodiment is advantageous for applications where a large volume of information is fragmented into packets and transmitted.

Figure 8A:
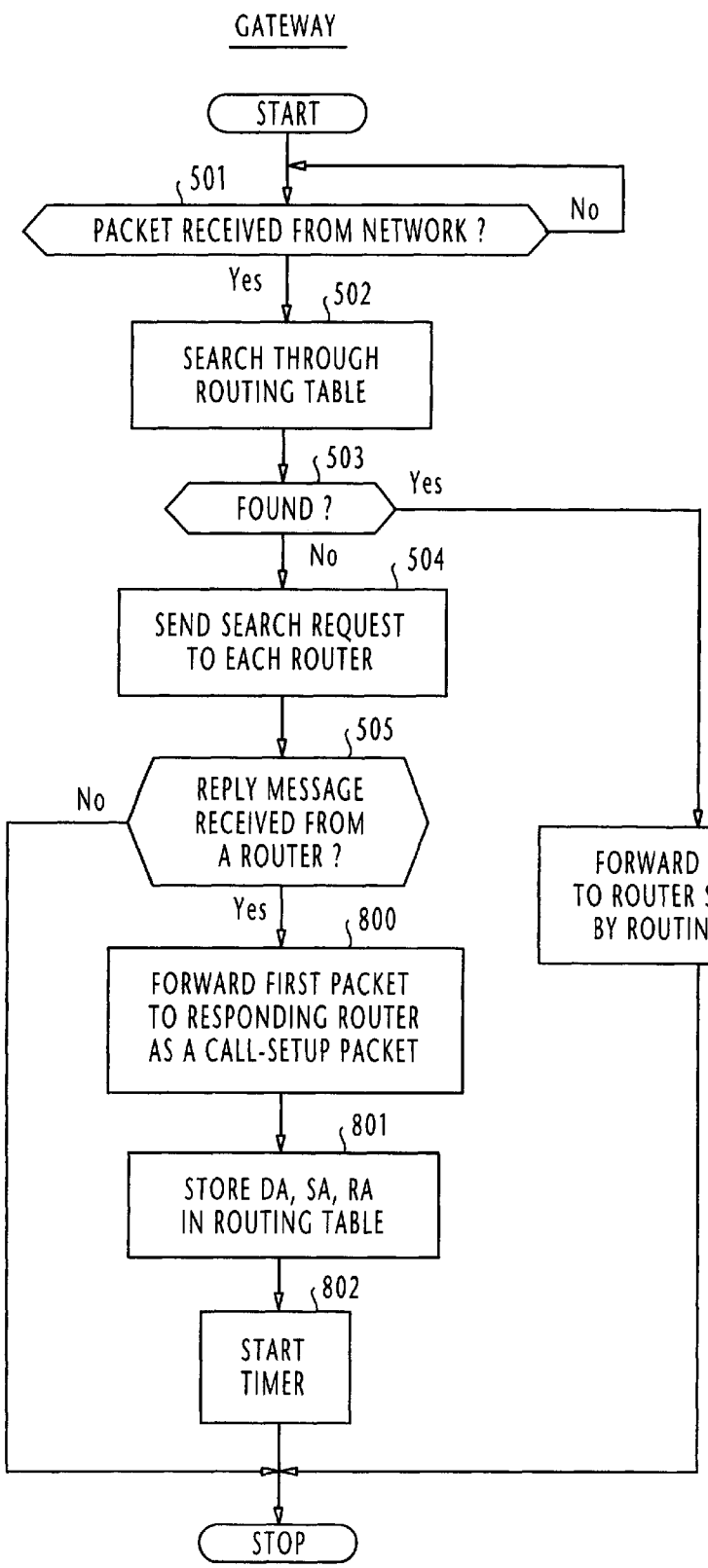
FIGS. 8A and 8B are flowcharts of the operation of the mobile gateway of FIG. 1 according to a second embodiment of the present invention.

The operation of the mobile gateway according to the second embodiment of this invention proceeds according to the flowchart of FIG. 8A. Note that because handover operation is identical to that of the previous embodiment, the description is concerned only with the establishment and teardown of a connection. The routine of this flowchart differs from that of FIG. 5 in that, when a reply message is received from a router (step 505), the routine proceeds to step 800 to forward the first packet received from the data network 114 as a call-setup packet to the responding router and then proceeds to step 801 to store the destination address (DA), the source address (SA) contained in the packet and the router address (RA) in the routing table 305. At step 802, the controller starts a timer and proceeds to the end of the routine.

Figure 8B:
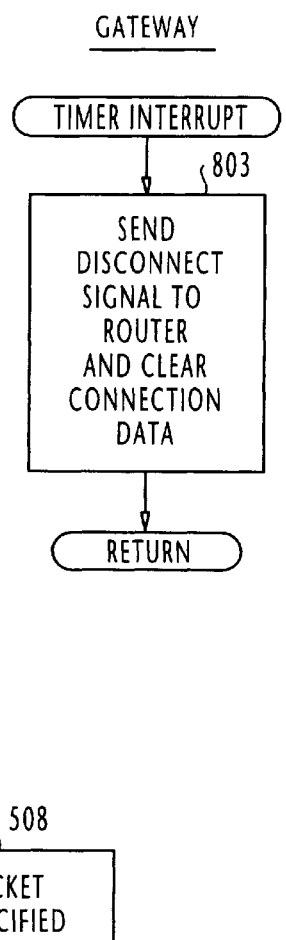

When the timer runs out, a timer interrupt routine is initiated in the gateway as shown in FIG. 8B by transmitting a disconnect signal to the router and clears the connection data of the packet stored in the routing table 305.

The operation of each mobile router according to the second embodiment of this invention proceeds according to the flowchart of FIG. 9, which differs from that of FIG. 6 in that, when the routing table 208 is updated with the routing data of the destination mobile station at step 606, the stored routing data is used as connection data in subsequent packet transfer processes.

When a reply message is sent to the gateway 114 from the router where the specified mobile station is found in the memory 208 (step 607), the routine proceeds to step 900 to transmit a call-setup packet to the base station specified by the updated routing table. In response, the base station defines a map between the destination mobile station and a channel number assigned to the mobile station to set up a connection between the router and the destination mobile station over the data channel identified by the assigned channel number. The base station is instructed to maintain the connection until it receives a disconnect signal from the router.

The router then proceeds from step 900 to step 901 to determine if a packet is received from the gateway. If so, the routine proceeds to step 902 to forward the received packet onto the established connection. If a subsequent packet is received from the gateway (step 601), the router proceeds to step 902 to forward the packet onto the established connection.

When a disconnect signal is received from the gateway 114 (step 601), the router proceeds to step 903 to clear the connection data of the packet transmissions stored in the routing table 208 and sends a disconnect signal to the destination base station to tear down the connection (step 904), and terminates the routine.

FIG. 10 shows a sequence diagram of incoming calls to the mobile station 130 according to the second embodiment. Assume that the mobile station 130 is in cell-site area of base station 131.

In response to a first packet P1 from the data network 115, the gateway 114 sends search request messages S1 to the routers 111, 112 and 113. Since the location data of the mobile station 130 is stored only in the router 111, the latter responds with a reply message R, while the other routers broadcast paging signals S2 only to find that the requested mobile station is not within their location areas, in much the same way as in the previous embodiment.

Following the transmission of the reply message R to the gateway, the router 111 transmits a call-setup packet C1 to the base station 131 specified by the routing table. Base station 131 assigns a data channel and transmits a call-setup command C2 to the mobile station 130 to notify the channel number of the assigned data channel to establish a wireless connection.

Gateway 114, on the other hand, responds to the reply message R from the router 111 by transmitting the first packet P1 to the router 111, while updating its own routing table 305 with the connection data (DA, SA, RA), and starts the timer.

If a second packet P2 of the same destination arrives within the timeout period of the timer, the gateway 114 forwards it to the router 111 by using the connection data of its routing table and restarts the timer. Router 111 then forwards the packet P2 onto the established connection. If packets P3 through Pn of the same destination as P2 arrive in rapid succession so that each of them occurs within the timeout period of the previous packet, they are transmitted in the same manner to the mobile station 130 over the maintained connection.

If the period of the timer expires following the transmission of the last packet Pn, the gateway 114 formulates and transmits a disconnect signal D1 to the router 111. Router 111 sends a disconnect signal D2 to the base station 131 and clears its connection data of the packet transmissions. Base station 131 sends a command signal D3 to the mobile station 130 and clears the wireless link that has been maintained.

What is claimed is:

1. A mobile communication system comprising:

a gateway connected to a connectionless data network;

a plurality of routers connected to said gateway; and a plurality of wireless access networks, connected respectively to said routers, for establishing wireless links with mobile stations, said gateway transmitting a request message to all of said routers in response to a packet from the connectionless data network for requesting a search for a mobile station specified by the packet, each of said routers including a memory for storing location data of mobile stations, making a search through said memory in response to said request message, responding with a reply message to the gateway if the specified mobile station is found in said memory, receiving said packet from the gateway only if the specified mobile station is found in said memory, and routing the received packet via the corresponding wireless access network to the mobile station.

2. The mobile communication system of claim 1, wherein said gateway is arranged to:

receive a series of packets of same destination from the connectionless data network, and transmit said request message to all of said routers in response to the packet of first arrival for requesting a search for a mobile station specified by the packet of first arrival and sequentially transmitting the received packets to one of the routers which responds with a reply message, each of said routers is arranged to respond to said request message with said reply message to receive said packets if the specified mobile station is found in said memory, and route the received packets via the corresponding wireless access network to the specified mobile station.

3. The mobile communication system of claim 2 wherein each of said routers is arranged to transmit a paging message to the corresponding wireless access network if the specified mobile station is not found in said memory for requesting a reply from the specified mobile station.

4. The mobile communication system of claim 2, wherein the reply message contains data necessary for routing said packet to one of said routers, and wherein said gateway includes a memory for receiving said data from each of said routers and storing the received data in the memory, said gateway routing a packet received from said data network according to the data stored in the memory.

5. The mobile communication system of claim 2, wherein the data stored in the memory of each of said routers contains an IP (Internet Protocol) address of the specified mobile station.

6. The mobile communication system of claim 2, wherein each of said wireless access networks comprises a group of cell-site base stations connected to a corresponding one of said routers to establish said wireless links with mobile stations located within coverage areas of the base stations.

7. The mobile communication system of claim 1, wherein said gateway is arranged to:

receive a series of packets of same destination from the connectionless data network, transmit a request message to all of said routers in response to receipt of the packet of first arrival for requesting a search for a mobile station specified by the packet of first arrival, transmit the packet of first arrival to one of the routers which responds with a reply message, transmit the packet of second arrival to the responding router if the packet of second arrival is received before a predetermined time interval expires, and transmit a disconnect signal to the responding router if said predetermined time interval expires after the transmission of each of the packets of first and second arrival, each of said routers is arranged to:

respond to said request message with said reply message if the specified mobile station is found in said memory to receive the packets of first and second arrival and establish a connection to the specified mobile station via the corresponding wireless access network, and transmit the received packets to the specified mobile station over the established connection, and clear said connection in response to said disconnect signal.

8. The mobile communication system of claim 7, wherein each of said routers is arranged to transmit a paging message to the corresponding wireless access network if the specified mobile station is not found in said memory for requesting a reply from the specified mobile station.

9. The mobile communication system of claim 7, wherein the reply message contains data necessary for routing said packet to one of said routers, and wherein said gateway includes a memory for receiving said data from each of said routers and storing the received data in the memory, said gateway routing a packet received from said data network according to the data stored in the memory.

10. The mobile communication system of claim 7, wherein the data stored in the memory of each of said routers contains an IP (Internet Protocol) address of the specified mobile station.

11. The mobile communication system of claim 7, wherein each of said wireless access networks comprises a group of cell-site base stations connected to a corresponding one of said routers to establish said wireless links with mobile stations located within coverage areas of the base stations.

12. The mobile communication system of claim 1, wherein each of said routers is arranged to transmit a paging message to the corresponding wireless access network if the specified mobile station is not found in said memory for requesting a reply from the specified mobile station.

13. The mobile communication system of claim 1, wherein the reply message contains data necessary for routing said packet to one of said routers, and wherein said gateway includes a memory for receiving said data from each of said routers and storing the received data in the memory, said gateway routing a packet received from said data network according to the data stored in the memory.

14. The mobile communication system of claim 1, wherein the data stored in the memory of each of said routers contains an IP (Internet Protocol) address of the specified mobile station.

15. The mobile communication system of claim 1, wherein each of said wireless access networks comprises a group of cell-site base stations connected to a corresponding one of said routers to establish said wireless links with mobile stations located within coverage areas of the base stations.

16. The mobile communication system of claim 15, wherein said gateway is co-located with a mobile switching center which is connected to a public switched telephone network.

17. The mobile communication system of claim 16, wherein each of said routers is co-located with a base station controller which is connected to said mobile switching center.

18. A method of communication for a system comprising a gateway connected to a connectionless data network, a plurality of routers connected to said gateway, and a plurality of wireless access networks, connected respectively to said routers, for establishing wireless links with mobile stations, each of said routers including a memory for storing location data of mobile stations, the method comprising the steps of:

a) receiving a packet of first arrival from the connectionless data network at said gateway;
   b) transmitting a request message from said gateway to all of said routers in response to receipt of the packet for requesting a search for a mobile station specified by the packet of first arrival;
   c) making a search through the memory of each of the routers in response to said request message from the gateway;
   d) receiving, at one of said routers, said packet from the gateway if the specified mobile station is found in the memory of said one router; and
   e) routing the received packet via the corresponding wireless access network to the mobile station.

19. The method of claim 18, wherein the step (c) comprises the step of transmitting a paging message from said one router to the corresponding wireless access network if the specified mobile station is not found in the memory of said one router for requesting a reply from the specified mobile station.

20. A method of communication for a system comprising gateway connected to a connectionless data network, a plurality of routers connected to said gateway, and a plurality of wireless access networks, connected respectively to said routers, for establishing wireless links with mobile stations, each of said routers including a memory for storing location data of mobile stations, the method comprising the steps of:

a) receiving, at said gateway, packets of first and second arrival of same destination from the connectionless data network;
   b) transmitting a request message from said gateway to all of said routers in response to receipt of the packet of first arrival for requesting a search for a mobile station specified by the packet of first arrival;
   c) making a search through the memory of each of the routers in response to said request message from the gateway;
   d) transmitting a reply message from one of said routers to said gateway if the specified mobile station is found in the memory of said one router;
   e) transmitting said packets from the gateway to said one router in response to said reply message; and
   f) receiving, at said one router, said packets from the gateway and routing the received packets via the corresponding wireless access network to the mobile station.

21. The method of claim 20, wherein the step (c) comprises the step of transmitting a paging message from said one router to the corresponding wireless access network if the specified mobile station is not found in the memory of said one router for requesting a reply from the specified mobile station.

22. A method of communication for a system comprising a gateway connected to a connectionless data network, a plurality of routers connected to said gateway, and a plurality of wireless access networks, connected respectively to said routers, for establishing wireless links with mobile stations, each of said routers including a memory for storing location data of mobile stations, the method comprising the steps of:

a) receiving, at said gateway, packets of first and second arrival of same destination from the connectionless data network;
   b) transmitting a request message from said gateway to all of said routers in response to receipt of the packet of first arrival for requesting a search for a mobile station specified by the packet;
   c) making a search, at each of said routers, through the memory of the router in response to said request message and transmitting a reply message back to said gateway from one of the routers if the specified mobile station is found in the memory of said one router and establishing a connection from said one router to the specified mobile station via the corresponding wireless access network;
   d) transmitting, from the gateway to said one router, the packet of first arrival in response to said reply message;
   e) transmitting, from the gateway to said one router, the packet of second arrival if the packet of second arrival is received before a predetermined time interval expires;
   f) transmitting, from the gateway to said one router, a disconnect signal if said predetermined time interval expires after the transmission of each of the packets of first and second arrival;
   g) transmitting said packets of first and second arrival from said one router to the specified mobile station over the established connection; and
   h) clearing said connection in response to said disconnect signal.

23. The method of claim 22, wherein the step (c) comprises the step of transmitting a paging message from said one router to the corresponding wireless access network if the specified mobile station is not found in the memory of said one router for requesting a reply from the specified mobile station.

* * * * *